April 17, 1962     G. K. HAUSE     3,029,662
POWER TRANSMISSION SYSTEM
Filed Nov. 27, 1959
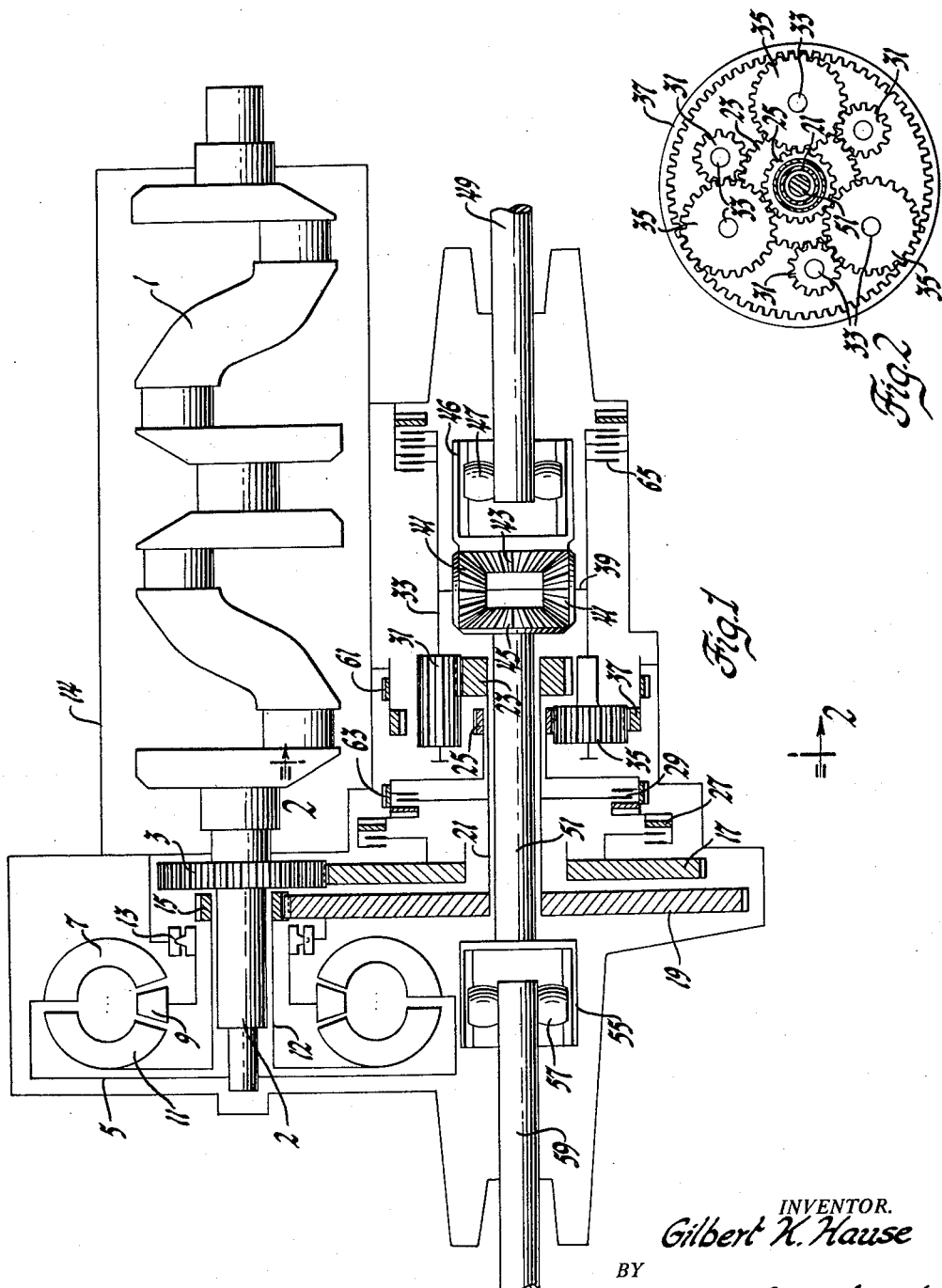
INVENTOR.
Gilbert K. Hause
BY
Robert B. Gerhardt
ATTORNEY

3,029,662
POWER TRANSMISSION SYSTEM

Gilbert K. Hause, Franklin, Mich., assignor to General Motors Corporation, Detroit, Mich., a corporation of Delaware
Filed Nov. 27, 1959, Ser. No. 855,840
21 Claims. (Cl. 74—695)

This invention relates to motor vehicle drives and more particularly to combined transmission, differential, and brake units for motor vehicles.

In the conventional motor vehicle, a longitudinally extending engine drives a separate unit multi-speed transmission providing two or more speed ratios. The transmission power output is then directed to a combination speed reducing and speed differential unit which divides the torque and directs the same to a pair of drive wheel axles. Individual wheel brakes are used for slowing the vehicle.

The present trend in motor vehicle power plants is to provide a so-called package power unit wherein the engine, transmission, and differential are combined into one assembly. Where such a package unit is utilized, it is expedient to provide pivoted half axles for the drive wheels. Since the pivots are in the form of universal joints, it is advantageous to space the pivots close together in order to keep the pivoting angle as small as possible. In order to provide as compact a power package as possible, it is desirable to have only two axes of rotation namely that of the engine and that of the drive axle output shafts. Where small engines are utilized for gasoline economy, light weight and smalll size purposes, it is necessary to provide a transmission having a substantially large overall speed ratio range in order to provide both high torque at the drive wheels for starting and acceleration, and high speed running drive for economic road load operation.

It is therefore an object of the present invention to provide a relatively simple compact power unit which performs all of the functions of the conventional transmission, differential, and wheel brakes.

It is a further object to provide a combined power unit that can be arranged either integral with, or adjacent to, the vehicle engine. Still another object is to provide a power unit which will provide automatic changes in torque and speed ratios in the drive from a vehicle engine to a pair of drive axles with a relatively large range of ratios being available.

These and other objects, features and advantages will be readily apparent from the following specification and drawing in which:

FIGURE 1 is a schematic representation of the invention shown as part of an engine-transmission package, and FIGURE 2 is a sectional view taken on the line 2—2 of FIGURE 1.

Referring to FIG. 1, it will be seen that the power unit is shown directly connected to an engine crankshaft 1. The engine which forms no part of the invention, may be of any suitable form and located at any suitable location, for example, it may be the type shown in S.N. 37,759 filed June 21, 1960, in the name of Gilbert K. Hause. The possible relative locations and vehicle arrangements are also shown in S.N. 37,759. The crankshaft 1 has an extension 2 forming an input shaft to a three-element hydraulic torque converter. Power is transmitted from the input shaft 2 through a shroud member 5 to a vaned impeller member represented by the vane 7. A conventional reaction stator represented by vane 9 and a turbine wheel represented by vane 11 form the other members of the torque converter. The stator 9 is connected to a one-way device, represented by the ratchet device 13, which prevents rearward rotation of the stator 9 with respect to the power unit stationary case 14. The turbine 11 drives a sleeve shaft 12 which surrounds the input shaft 2 and has a gear 15 formed or secured on its end remote from the turbine 11.

The input shaft 2 has a gear 3 secured thereto which meshes with a larger gear 17 rotatable on an axis spaced from and parallel to the axis of the crankshaft 1 and input shaft 2. The turbine output gear 15 also meshes with a large diameter gear 19 carried on the end of a sleeve shaft 21 in turn having a gear 23 formed on the end thereof. The gear 23 forms a sun gear of a compound planetary gear unit which also includes a smaller sun gear 25 that can be connected to the gear 17 by a clutch 27. The planetary gear unit also includes a plurality of long pinion gears 31 rotatably mounted on a gear carrier 33, the gears 31 meshing with the large sun gear 23. Meshing with the smaller sun gear 25, and with the long pinion gears 31, are shorter but larger diameter pinion gears 35 also rotatably mounted on the carrier member 33. A ring gear 37 meshes with the short pinions 35.

The gear carrier 33 is connected to drive a differential carrier member 39 having a pair of opposed bevel gears 41 secured thereon which mesh with a second pair of opposed bevel gears 43 and 45. The bevel gear 43 is secured to the outer drive member 46 of an axially sliding or pot type universal joint having an axial sliding pivot pin 47 connected to and driving an output shaft or axle 49. The other bevel gear 45 is connected to a shaft 51 which extends through the sleeve shaft 21 and carries an outer element 55 of a second axially sliding or pot type universal joint having a sliding pivot pin 57 connected to and driving a second output shaft or axle 59. It will be obvious that shafts 49 and 59 can be drive wheel half axles of the vehicle in which the transmission unit is mounted, or they can transmit torque in opposite directions to a pair of drive axles as in a four-wheel drive vehicle.

A direct drive clutch 29 connects the sun gear 25 with the shaft 21 and hence sun gear 23 when it is applied. A friction brake band 61 surrounds the ring gear 37 and holds the same from rotation when it is applied. A second brake band 63 holds the sun gear 25 when it is applied. The brake band 63 provides forward gear reaction in the planetary gearing while the band 61 provides reverse gear reaction when it is applied.

A multiple disc brake 65 when applied, brakes the carrier member 33 and through the differential carrier 39 and pinion gears 41, 43, 45 differentially brakes and slows the rotation of output shafts 49 and 59.

Operation

With both clutches and both bands released, the transmission is in neutral since the planetary gear set cannot transmit drive without reaction. For starting and low speeds, band 63 is applied to hold sun gear 25 against rotation. Drive is transmitted from the engine shaft 1 to the converter impeller 7 which circulates working fluid which impinges on and drives turbine 11. Stator 9 redirects reversely rotating oil leaving the turbine into a forward rotation when re-entering the impeller vanes 7. The stator 9 is held against reverse rotation by one-way device 13. The converter operates as a conventional three-element converter to initially provide torque multiplication and speed decrease and gradually reduces this multiplication until the stator 9 freewheels forwardly and the converter performs as a fluid coupling with a one-to-one torque ratio at slightly less than one-to-one speed ratio.

The drive received by turbine 11 is transmitted by sleeve shaft 12 to the small gear 15 which in turn drives large gear 19 to further multiply the torque. The gear 19 drives sun gear 23 by means of shaft 21. With sun gear 25 held against rotation, the carrier 33 is then caused to rotate forwardly at a further multiplied torque and reduced speed. The carrier 33 drives the differential carrier 39 and its bevel gears 41 in unison about the axis of gears 43—45. Gears 43 and 45 drive the outer pots 46—55 of the universal joints which transmit torque to the output shafts 49 and 59.

If the loads on shafts 49 and 59 are unequal, the bevel gears 41 will rotate on their carrier 39 to provide differential drive to the output shafts 49 and 59 and drive wheels (not shown) therefrom. The differential gearing allows the shafts 49—59 to turn at different speeds as when turning a corner. Since the shaft 21 and sun gear 23 are rotating at a speed considerably lower than the speed of the input shaft 1—2, the spin losses in the planetary gearing will be low and the gears will run relatively quiet.

For intermediate drive, band 63 is released and clutch 29 is applied. The sun gears 23 and 25 are then both made to rotate with shaft 21 driven by the gearing 15—19 and the torque converter. The planetary gearing then rotates as a unit and provides a direct drive one-to-one torque and speed ratio. The planet carrier 33 drives the output shafts 49—59 in the same manner as in low drive. In the intermediate drive condition, all of the drive is through the torque converter as in the case of low ratio drive.

For high or split torque drive, clutch 29 is released and clutch 27 applied. Part of the engine torque will then be transmitted through torque multiplying gears 3—17, clutch 27 to the sun gear 25 while the remainder of the torque will continue to be transmitted by the torque converter and gears 15—19 to sun gear 23. With sun gear 25 driven at a faster rate than sun gear 23 due to the relative sizes of gears 3—17 compared to gears 15—19, the planetary gearing will increase the speed or overdrive the carrier 33 with respect to the sun gears 23 and 25. Again the carrier 33 drives the output shafts 49—59 through the differential gearing 41—43—45.

In this high or split torque condition a higher proportion of the engine torque passes through the high efficiency mechanical drive path provided by gears 3—17, and clutch 27. Only a portion of the drive is through the converter which while having a relatively high efficiency when operating as a fluid coupling, will necessarily have some slip loss. By keeping the torque converter in the drive for part of the engine torque, the fluid action is still available for torque multiplication, as when accelerating at medium speeds in high or split torque drive operation. Also, since only a portion of the engine torque is taken from the input to the converter and applied to the sun gear 25, a shift from intermediate to high will be smooth without jerk.

For reverse drive only the band 61 is applied. Ring gear 37 is then held and all of the drive is through the torque converter, gears 15—19 and sun gear 23. With ring gear 37 held and sun gear 23 driven, the carrier 33 will be caused to rotate in a reverse direction. The reverse rotation of carrier 33 is transmitted through the differential gears to the output shaft 49—59.

Coast braking can be obtained either by applying the clutch 29 or band 61. When clutch 29 is applied the planetary gear set transmits torque from the wheels at a one-to-one ratio to the gear 19 whereby turbine 11 is overdriven at the ratio of gears 19—15. When band 61 is applied, the planetary gearing overdrives the gear 19 whereby turbine 11 is overdriven at the ratio of gears 19—15 times the low ratio of the planetary gearing.

As an example of a representative transmission unit the following tooth ratios may be used. Gears 17—3, 2.42 to 1 ratio; gears 19—15, 5.5 to 1 ratio; gears 25—23, .743 to 1 ratio; and gears 25—37, .291 to 1 ratio. If a 2.2 to 1 stall torque hydraulic torque converter is used, the following speed ratios can be obtained: In low (band 63 applied) the overall ratio between input shaft 2 and output shafts 49 and 59 varies between a maximum of 21 to 1 at stall and 9.6 to 1 with the converter operating as a fluid coupling. In intermediate (clutch 29 applied), the overall ratio varies between a maximum of 12.1 to 1 and 5.5 to 1. In high or split torque (clutch 27 applied) the ratio can vary between 4.4 to 1 and 3.6 to 1. In reverse drive (band 61 applied), the ratio can vary between 18.7 to 1 and 8.5 to 1. In any installation the exact overall ratio at any particular load and speed condition will depend on the torque converter design and the shift point of the hydraulic controls. It will be seen that the maximum torque ratio obtained is 21 to 1 and the minimum ratio 3.6 to 1. Thus the maximum torque ratio is almost six times that of the minimum whereby a large starting torque will be available and an efficient speed road load is also available.

For normal vehicle braking the disc brake 65 is applied to slow the rotation of the carrier member 33 and hence differential carrier 39. The output shafts 49—59 are then differentially slowed as are the drive wheels connected to these shafts.

It will be seen that I have provided a relatively simple compact power transmission unit that performs the normal functions of torque multiplying transmission, differential and torque multiplying axle and wheel brakes. The unit is especially adapted for combination with an engine and can be mounted either as a front or rear wheel drive, or as a unit for a four wheel drive. The unit provides an unusually large range of speed ratios with a large starting torque multiplication and yet provides efficient mechanical drive for road load conditions. The invention is easily adapted to various types of manual or automatic transmission controls.

Other embodiments as well as changes and applications will be readily apparent to those skilled in the art and these can be made without departing from the spirit of the invention which is limited only by the following claims.

I claim:

1. A combination transmission and differential unit having an input shaft, a change speed gear reduction unit, first means including a fluid torque transmitting device between said input shaft and said gear unit for driving the same, and second means between said input shaft and said gear unit for at times driving the same, a differential gear unit connected to be driven by said gear reduction unit and having a pair of oppositely extending output members, said input shaft and said fluid torque transmitting device rotatable on a first axis, said gear reduction unit and said differential gear unit output members rotatable on a second axis spaced from and parallel to said first axis.

2. The combination of claim 1 wherein said second means includes a series connected releasable connection and a fixed ratio speed reduction gearing.

3. A combination transmission and differential unit having an input shaft, a gear reduction unit, first torque transmitting means including a hydraulic torque converter between said input shaft and said gear unit for driving the same at a variable speed with respect to said input shaft, second means including a releasable connection and speed reduction gearing between said input shaft and said gear unit for at times driving the gear unit at a fixed reduced speed with respect to said input shaft simultaneously with drive by said first means, and a speed differential gear unit having an input connected to be driven by said gear unit and a pair of output members.

4. A multi-speed transmission having an input shaft rotatable on a first axis, a fluid torque transmitting unit having driving and driven elements rotatable on an axis common to said first axis, said driving element connected to be driven by said input shaft, a multi-speed gear unit rotatable on a second axis spaced from and parallel to said first axis, first drive transmitting means between said fluid torque transmitting driven element and said gear unit for transmitting drive from said input shaft to said gear unit through said fluid transmitting unit, and second drive transmitting means including a releasable connection connected to said input shaft and said gear unit for at times directly transmitting drive from said input shaft to said gear unit, said gear unit having an output member.

5. The transmission of claim 4 wherein said first drive transmitting means includes gearing providing a first predetermined speed ratio and said second drive transmitting means includes gearing providing a second predetermined speed ratio.

6. The transmission of claim 4 wherein said first drive transmitting means includes gearing providing a first predetermined speed ratio and said second drive transmitting means includes gearing providing a second predetermine speed ratio lower than said first predetermined speed ratio.

7. The transmission of claim 4 wherein said gear unit includes a pair of input gear elements and an output element, said first drive transmitting means connected to one of said input gear elements and said second drive transmitting means connected to the other of said input gear elements.

8. A multi-speed transmission including an input shaft, a fluid torque transmitting device connected to be driven by said input shaft, a two speed planetary gear unit having an input element connected through first fixed ratio gearing means to said fluid torque device, a reaction element and an output element, releasable means for holding said reaction element to cause said gear unit to transmit drive from said first fixed ratio gearing means to said output element at a reduced ratio, releasable means for connecting said input element and said reaction element to cause said gear unit to transmit drive from said first fixed ratio gearing means to said output element at a one-to-one ratio, and means including a releasable connection and second fixed ratio gearing means connecting said input shaft with said reaction element, said second fixed ratio gearing means having a different ratio than said first gearing, whereby said planetary gear unit is differentially driven by said first and said second gear units.

9. A multi-speed transmission including an input shaft, a fluid torque transmitting device connected to be driven by said input shaft, a planetary gear unit having a first sun gear connected through first fixed ratio gearing to said fluid torque device, a second sun gear and an output gear carrier having a pair of intermeshing planet gears each meshing with one of said sun gears, releasable means for holding said second sun gear to cause said gear unit to transmit drive from said fixed ratio gearing to said output carrier at a reduced ratio, releasable means for connecting said first sun gear and said second sun gear to cause said gear unit to transmit drive from said first fixed ratio gearing to said output carrier at one-to-one ratio, means including a releasable connection and second fixed ratio gearing connecting said input shaft with said second sun gear, said second fixed ratio gearing having a different ratio than said first gearing, whereby said planetary gear unit is differentially driven by said first and said second gear units driving said first and second sun gears respectively, and an output shaft connected to said output carrier.

10. The transmission of claim 9 wherein said planetary gear unit includes a ring gear meshing with one of said planet gears, and releasable means for holding said ring gear to provide reduced reverse drive of said output carrier.

11. A multi-speed transmission having an input shaft on a first axis, a fluid torque transmitting unit having driving and driven elements rotatable on said first axis, said driving element connected to be driven by said input shaft, a multi-speed gear unit rotatable on a second axis spaced from and parallel to said first axis, first drive transmitting means between said fluid torque transmitting driven element and said gear unit for transmitting drive from said input shaft to said gear unit through said fluid transmitting unit, and second drive transmitting means including a releasable connection connected to said input shaft and said gear unit for at times directly transmitting drive from said input shaft to said gear unit, a differential gear device including an input gear connected to be driven by said gear unit and a pair of output gears rotatable on said second axis, and a pair of output members rotatable on said second axis and connected to be driven by one of said output gears.

12. A multi-speed transmission having an input shaft on a first axis, a fluid torque transmitting unit having driving and driven fluid elements rotatable on an axis common to said first axis, said driving element connected to be driven by said input shaft, a multi-speed gear unit rotatable on a second axis spaced from and parallel to said first axis, a sleeve shaft surrounding said input shaft and having a first gear rotatable therewith, said sleeve shaft conected to said fluid torque transmitting unit driven element for drive thereby, said multi-speed gear unit having a first input element connected to an intermediate shaft rotatable on said second axis, said intermediate shaft having a second gear thereon meshing with said first gear, a third gear secured for rotation with said input shaft, a fourth gear rotatable on said second axis and meshing with said third gear, a second input element for said multi-speed gear unit, means including a clutch for connecting said second input element to said fourth gear, and an output member for said multi-speed gear unit.

13. A multi-speed transmission having an input shaft rotatable on a first axis, a fluid torque converter unit having driving, driven, and reaction elements rotatable on an axis common to said first axis, said driving element connected to be driven by said input shaft, means for preventing rotation of said reaction element in a rearward direction relative to the rotation of said driving element, a multi-speed gear unit rotatable on a second axis spaced from and parallel to said first axis, a sleeve shaft surrounding said input shaft and having a first gear rotatable therewith, said sleeve shaft connected to said torque converter driven element for drive thereby, said multi-speed gear unit having a first input element connected to an intermediate shaft rotatable on said second axis, said intermediate shaft having a second gear thereon meshing with said first gear, a third gear secured for rotation with said input shaft, a fourth gear rotatable on said second axis and meshing with said third gear, a second input element for said multi-speed gear unit, means including a clutch for connecting said second input element to said fourth gear, and an output member for said multi-speed gear unit.

14. A combined transmission and differential unit having an input shaft on a first axis, a fluid torque converter unit having driving and driven elements rotatable on an axis common to said first axis, said driving element connected to be driven by said input shaft, a multi-speed gear unit rotatable on a second axis spaced from and parallel to said first axis, a first sleeve shaft surrounding said input shaft and having a first gear rotatable therewith, said sleeve shaft connected to said torque converter driven element for drive thereby, said multi-speed gear unit having a first input element connected to a second sleeve shaft rotatable on said second axis, said second sleeve shaft having a second gear thereon meshing with said first gear, a third gear secured for rotation with said input shaft, a fourth gear rotatable on said second axis and meshing with said third gear, a second input element for said multi-speed gear unit, means including a clutch for connecting said second input element to said fourth gear, an output member for said multi-speed gear unit, a differential gear unit having an input gear driven by said output member and a pair of output gears rotatable on said second axis, one of said output gears connected to a first output shaft extending through said second sleeve shaft and the other of said output gears connected to a second output shaft extending in the opposite direction from said first output shaft.

15. A multi-speed transmission including a planetary gear unit having an input element, an output element and a combination reaction and input element, releasable means for holding said combination reaction and input element, means for driving said input element, clutch means for connecting said input and said combination reaction and input elements for joint rotation, and releasable means for driving said combination reaction and input element at a speed different from the speed of said input element.

16. The transmission of claim 15 wherein said gear unit includes a second reaction element for providing reverse drive reaction in said gear unit, and releasable means for holding said second reaction element.

17. In a multi-speed transmission, the combination including an input shaft, a fluid torque transmitting device having an input member connected to be driven by said input shaft, and an output member, a gear unit having a first input gear element, a reaction gear element and an output gear element, first connecting means connecting said input element and said output member for drive of said input element at a predetermined speed relative to the speed of said output member, a plurality of releasable drive controlling members for said gear unit providing reduced speed drive of said output element relative to said input element and one-to-one drive of said output element relative to said input element, and second connecting means including releasable coupling means connecting said input shaft and said reaction element to drive said reaction element at a speed greater than said predetermined speed, said gear unit being differentially driven by said first and second connecting means to drive said output element at an overdrive speed ratio relative to said input element.

18. The combination of claim 17 wherein said gear unit includes a reverse reaction gear element, and releasable means for holding said reverse reaction gear element to provide reverse drive of said output element relative to said input element.

19. Drive mechanism for a motor vehicle including an engine and a fluid torque transmitting unit driven by the engine arranged on a first axis, a change speed gear unit having a pair of input elements and an output element arranged on a second axis spaced from and parallel to said first axis, first means connecting said fluid torque transmitting unit to one of said input elements for drive thereof at a predetermined speed relative to said fluid torque transmitting unit, second means for connecting said engine to the other of said input elements for drive thereof at a speed other than said predetermined speed, said first and second means providing a differential input drive of said gear unit, a differential gear unit having an input gear connected to be driven by said output element and a pair of differential output gears rotatable on said second axis, and a pair of output shafts connected to said output gears.

20. The drive mechanism of claim 19 wherein said fluid torque transmitting unit constitutes a hydraulic torque converter having an impeller connected for drive by said engine, a fluid reaction member and a turbine member connected to said first means.

21. The drive mechanism of claim 19 wherein said change speed gear unit comprises a planetary gear unit having releasable drive establishing members providing reduced speed, direct and reverse speed drive between said one input element and said output element and wherein said second means constitutes gearing for driving said other input element at a speed greater than the speed of said one input element.

References Cited in the file of this patent
UNITED STATES PATENTS

| | | |
|---|---|---|
| 2,326,752 | Buckendale | Aug. 17, 1943 |
| 2,448,345 | Aronson | Aug. 31, 1948 |
| 2,712,857 | Jackson | July 12, 1955 |
| 2,725,762 | Hettinger | Dec. 6, 1955 |
| 2,889,715 | De Lorean | June 9, 1959 |